United States Patent [19]

Takahashi et al.

[11] Patent Number: 5,392,354
[45] Date of Patent: Feb. 21, 1995

[54] CORDLESS PHONE SYSTEM CAPABLE OF SCRAMBLING COMMUNICATION SIGNALS

[75] Inventors: Yuji Takahashi; Hideo Fukasawa, both of Kawasaki, Japan

[73] Assignee: Fujitsu Limited, Kawasaki, Japan

[21] Appl. No.: 968,982

[22] Filed: Oct. 30, 1992

[30] Foreign Application Priority Data

Oct. 30, 1991 [JP] Japan ................................. 3-283379

[51] Int. Cl.⁶ ................................................ H04L 9/00
[52] U.S. Cl. ........................................ 380/23; 380/9; 380/38
[58] Field of Search ................................. 380/23, 38, 9

[56] References Cited

U.S. PATENT DOCUMENTS

| | | | |
|---|---|---|---|
| 4,920,567 | 4/1990 | Malek | 380/9 |
| 5,073,932 | 12/1991 | Yossifor et al. | 380/23 |
| 5,077,790 | 12/1991 | D'Amico et al. | 380/23 |
| 5,091,941 | 2/1992 | Needle et al. | 380/9 |
| 5,140,635 | 8/1992 | Houghton et al. | 380/38 |
| 5,168,522 | 12/1992 | Simanis et al. | 380/38 |
| 5,247,576 | 12/1993 | Bright | 380/23 |

*Primary Examiner*—Salvatore Cangialosi

[57] ABSTRACT

A cordless phone system includes a first cordless phone and a second cordless phone which are coupled to each other by a network, the first cordless phone being formed of a first personal station and a first base station, the second cordless phone being formed of a second personal station and a second base station. The cordless phone includes a scrambler, provided in the first personal station, for scrambling communication signals in a predetermined scrambling manner, the communication signals scrambled by the scrambler being transmitted from the first personal station to the first base station in radio, a first relay circuit, provided in the first base station, for receiving the communication signals from the first personal station and for transmitting the communication signals, without disscrambling, to the second base station via the network, a second relay circuit, provided in the second base station, for receiving the communication signals from the first base station and for transmitting the communication signals, without scrambling, to the second personal station in radio; and a disscrambler, provided in the second personal station, for disscrambling the communication signals transmitted from the second base station in radio in a predetermined disscrambling manner corresponding to the scrambling manner in the first personal station, so that original communication signals are restored.

8 Claims, 6 Drawing Sheets

CORDLESS PHONE SYSTEM CAPABLE OF SCRAMBLING COMMUNICATION SIGNALS

BACKGROUND OF THE INVENTION (1) Field of the Invention

The present invention generally relates to a cordless phone system capable of scrambling communication signals, and more particularly to a cordless phone system capable of scrambling communication signals in which system communication quality can be prevented from deteriorating by scrambling.

(2) Description of Related Art

Recently, cordless phones have been spread. The cordless phones can be tapped by other persons. Thus, to prevent from being tapped, a scrambling technique has been applied to the cordless phones.

Figure 1A:
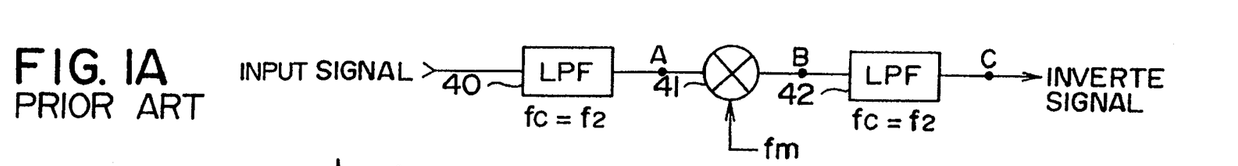
FIG. 1A is a block diagram illustrating an example of a conventional scrambler.

Communication signals to be transmitted in radio are scrambled by a scrambler, for example, as shown in FIG. 1A. This scrambler inverts the frequency spectrum of the input signals and outputs inverted signals having an inverted frequency spectrum, so that the input signals are scrambled. This type of scrambling manner is often referred to as a frequency inversion method.

Figure 1B:
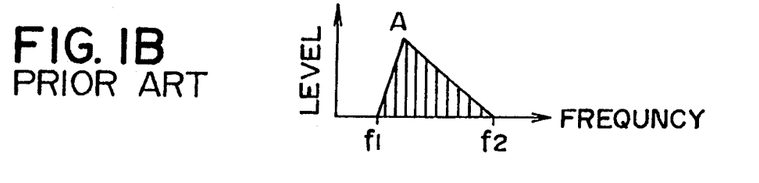
FIGS. 1B, 1C and 1D are graphs illustrating frequency spectrum at various points in the scrambler shown in FIG. 1A.
Figure 1C:
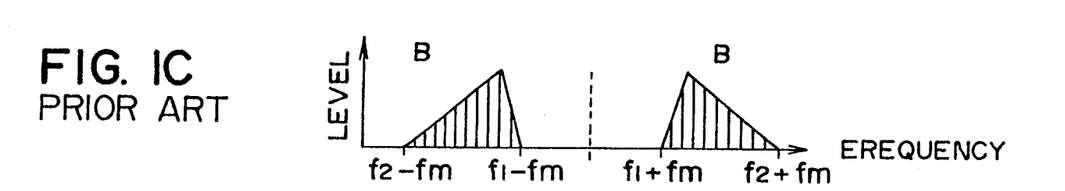
Figure 1D:
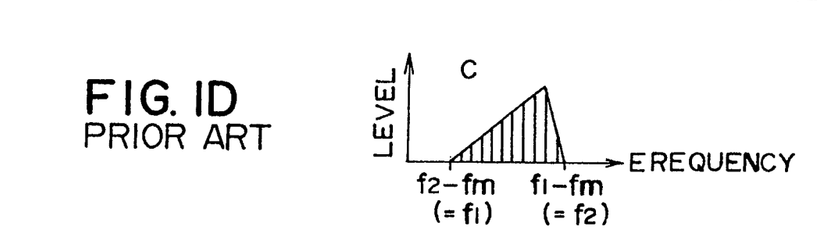

Referring to FIG. 1A., an input communication signal is supplied to a first low pass filter (LPF) 40, and only frequency components, of the input signal, within a range between a higher cut-off frequency f2 (e.g. 3300 Hz) and a lower cut-off frequency f1 (e.g. 300 Hz) pass through the first low pass filter 40. As a result, the frequency spectrum as shown in FIG. 1B is obtained at an output point (A) of the first low pass filter 40. The communication signal output from the first low pass filter 40 is supplied to a modulator 41. The modulator 41 modulates a carrier having a frequency fm based on the communication signal supplied from the first low pass filter 40, so that two frequency spectrums as shown in FIG. 1C are obtained at an output point (B) of the modulator 41. The first frequency spectrum is in a frequency range between (f2−fm) and (f1−fm), and the second frequency spectrum is in a frequency range between (f1+fm) and (f2+fm). The output signal from the modulator 41 is supplied to a second low pass filter 42, and frequency components in only the first frequency spectrum can pass through the second low pass filter 42. As a result, a frequency spectrum as shown in FIG. 1D is obtained at an output point (C) of the second low pass filter 42. That is, this scrambler outputs an inverted signal having a frequency spectrum as shown in FIG. 1D.

The inverted signal output from the scrambler is modulated in accordance with a frequency modulation (FM) process at a radio frequency of a radio channel, and the modulated signal is transmitted, as a radio signal, via the radio channel. The radio signal is demodulated in a receiver, and then the signal having the inverted frequency spectrum is modulated based on the carrier (fm), so that the signal having an original frequency spectrum is restored. Then the communication signal is obtained.

There are various well-known scrambling manners other than the above frequency inversion method, referred to, for example, as a method in which the radio channel is changed during communication.

Figure 2:
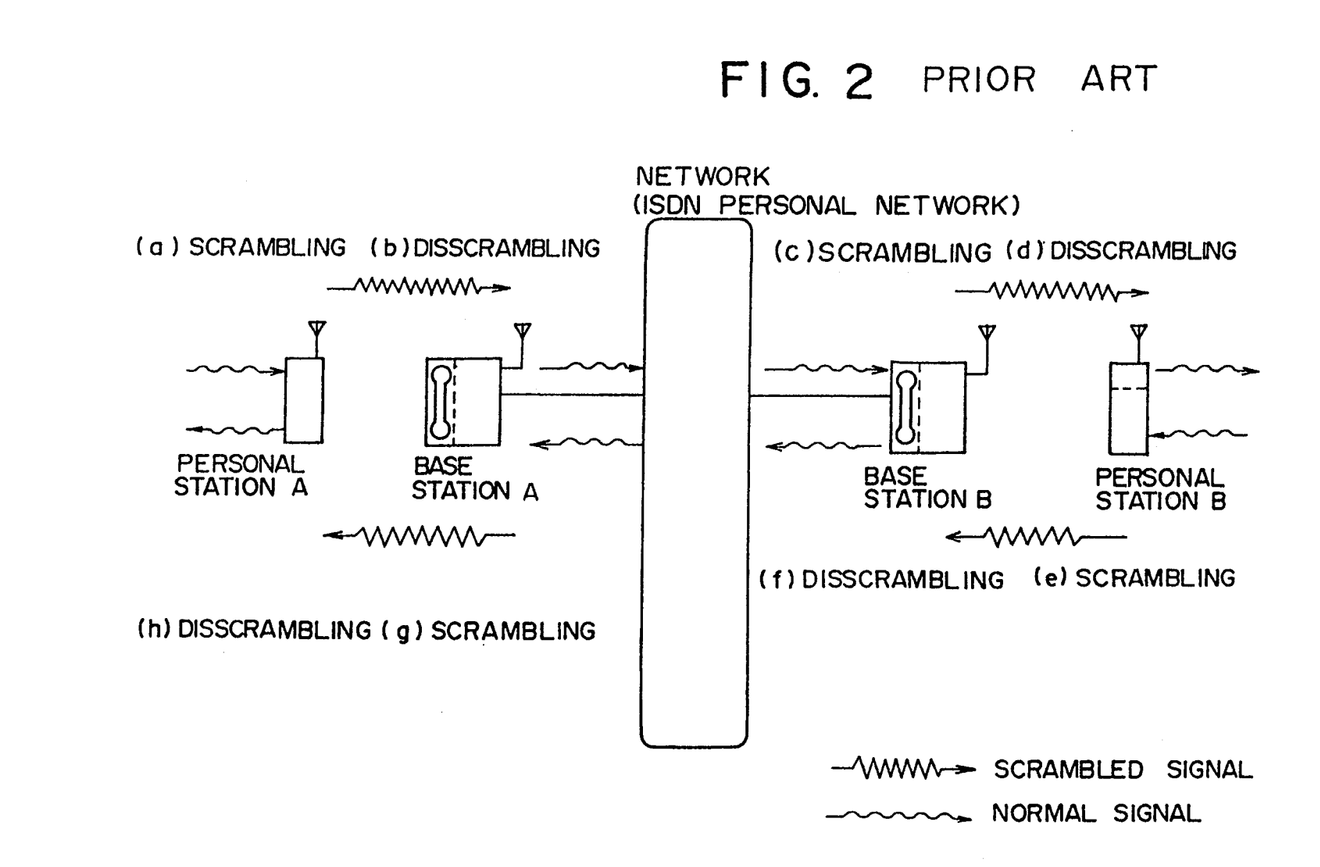
FIG. 2 is a diagram illustrating a conventional cordless phone system.

FIG. 2 shows a conventional cordless phone system capable of scrambling communication signals.

Referring to FIG. 2, a first cordless phone comprises a personal station A and a base station A. The base station A is coupled to a public data network (e.g., an ISDN or a private network). A second cordless phone comprises a personal station B and a base station B. The base station B is also coupled to the public data network, so that the base stations A and B of the first and second cordless phones are coupled to each other via the public data network. In this conventional cordless phone system, a communication signal corresponding to speech of a user is scrambled in the personal station A of the first cordless phone (a), and the scrambled communication signal is transmitted from the personal station A to the base station A via a predetermined radio channel. The scrambled communication signal received by the base station is disscrambled so that the original communication signal is restored (b). The communication signal output from the base station A of the first cordless phone is transmitted to the base station B of the second cordless phone via the public data network. The communication signal received by the base station B of the second cordless phone is scrambled again (c), and the scrambled communication signal is transmitted from the base station S to the personal station B via a predetermined radio channel. The scrambled communication signal received by the personal station B of the second cordless phone is disscrambled again (d), and the original communication signal is restored. Then the personal station B of the second cordless phone reproduces speech base on the restored communication signal. In a case where the communication signal is transmitted from the personal station B of the second cordless phone, the personal station B scrambles the communication signal (e), the base station B of the second cordless phone disscrambles the scrambled communication signal (f), the base station A of the first cordless phone scrambles the received communication signal again (g), and the personal station A of the first cordless phone disscrambles the scrambled communication signal again (h), in the same manner as those in the above case where the communication signal is transmitted from the personal station of the first cordless phone.

In the above conventional cordless phone system, the first cordless phone comprising the personal station A and the base station A carries out both a scrambling process and a corresponding disscrambling process. The second cordless phone also carries out both a scrambling process and a corresponding disscrambling process. Frequency characteristics of communication signals are changed every time the scrambling or disscrambling process is performed. Thus, as a large number of scrambling and the disscrambling processes are performed in the conventional cordless phone system, communication quality between the personal stations deteriorates in comparison with the communication quality without scrambling.

SUMMARY OF THE INVENTION

Accordingly, a general object of the present invention is to provide a cordless phone system capable of scrambling in which the disadvantages of the aforementioned prior art are eliminated.

A more specific object of the present invention is to provide a cordless phone system capable of scrambling in which system communication quality can be prevented from deteriorating in the communication between personal stations.

The above objects of the present invention are achieved by a cordless phone system having a first cordless phone and a second cordless phone which are coupled to each other by a network, the first cordless phone being formed of a first personal station and a first base station, the second cordless phone being formed of a second personal station and a second base station, the cordless phone comprising: scrambling means, provided in the first personal station, for scrambling communication signals in a predetermined scrambling manner, the communication signals scrambled by the scrambling means being transmitted from the first personal station to the first base station in radio; first relay means, provided in the first base station, for receiving the communication signals from the first personal station and for transmitting the communication signals, without disscrambling, to the second base station via the network; second relay means, provided in the second base station, for receiving the communication signals from the first base station and for transmitting the communication signals, without scrambling, to the second personal station in radio; and disscrambling means, provided in the second personal station, for disscrambling the communication signals transmitted from the second base station in radio in a predetermined disscrambling manner corresponding to the scrambling manner in the first personal station, so that original communication signals originated by the first personal station are restored.

According to the present invention, in the communication between the first and second personal stations, the scrambling-and disscrambling processes are performed once only. Thus, the communication quality deteriorates little.

Additional objects, features and advantages of the present invention will become apparent from the following detailed description when read in conjunction with the accompanying drawings.

DESCRIPTION OF THE PREFERRED EMBODIMENT

A description will now be given, with reference to FIG. 3, of the principle of an embodiment of the present invention.

Figure 3:
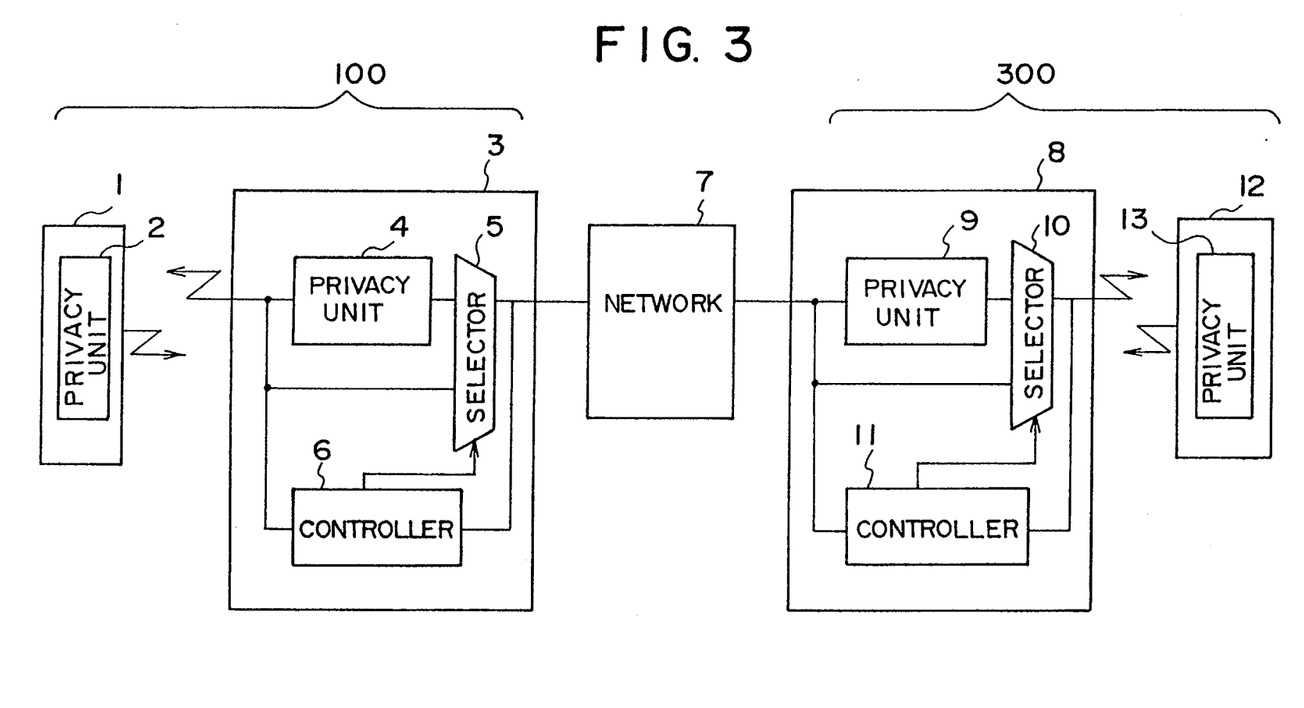
FIG. 3 is a block diagram illustrating an essential part of a cordless phone system according to a first embodiment of the present invention.

Referring to FIG. 3, a first cordless phone 100 comprises a personal station 1 and a base station 3. Radio communication is performed between the personal station 1 and the base station 3. The base station 3 is coupled to a network 7 (including a PBX network, an ISDN or the like) by a cable. A second cordless phone 300 comprises a personal station 12 and a base station 8 coupled to the network 7 by a cable. The personal stations 1 and 12 respectively have privacy communication units 2 and 13 each of which has a scrambler and a disscrambler. The base stations 3 and 8 respectively have privacy communication units 4 and 9, selectors 5 and 10, and controllers 6 and 11. The controllers 6 and 9 respectively control the selectors 5 and 10 so that the selectors 5 and 10 select output ports of the privacy communication units 4 and 9 or input ports of the privacy communication units 4 and 9.

When the personal station 1 of the first cordless phone 100 dials the second cordless phone 300, the personal station 12 of the second cordless phone 300 is called in via the network 7 and the base station 8 of the second cordless phone 300. Then, when an operation of the personal station 12 is performed in response to the call in, the communication between the personal stations 1 and 12 can be performed. The controller 6 determines whether or not the second cordless phone 300 scrambles communication signals in the same scrambling manner as the first cordless phone 100. When the second cordless phone 300 scrambles the communication signals in the same scrambling manner as the first cordless phone 100, the controller 6 makes the selector 5 to select the input port of the privacy communication unit 4. As a result, the scrambled communication signal supplied from the personal station 1 in radio is transmitted to the base station 8 of the second cordless phone 300 via the selector 5 and the network 7 without disscrambling. In the base station 8 of the second cordless phone 300, the controller 11 determines whether or not the first cordless phone. 100 scrambles communication signals in the same scrambling manner as the second cordless phone 300. When the controller 11 determines that the first cordless phone 100 scrambles the communication signals in the same scrambling manner as the second cordless phone 300, the controller 11 makes the selector 10 to select the input port of the privacy communication unit 9. As a result, the scrambled communication signal received by the base station 8 is transmitted to the personal station 12 of the second cordless phone 300 without scrambling in radio. The privacy communication unit 13 of the personal station 12 disscrambles the scrambled communication signal transmitted from the base station 8, so that the original communication signal is restored in the personal station 12 of the second cordless phone 300.

In the above cordless phone system, when the communication is performed between the personal stations 1 and 12 of the first and second cordless phones 100 and 300 with scrambling, each of the scrambling process and the disscrambling process is performed at only one time. The number of times that the communication signals are scrambled and disscrambled is decreased. Thus, the communication quality deteriorates little.

The controller 6 of the base station 3 of the first cordless phone 100 has, for example, a storage for storing phone numbers each specifying a cordless phone in which communication signals are scrambled in the same scrambling manner as the first cordless phone 100. In this case, controller 6 determines, with reference to the phone numbers stored in the storage, whether or not the communication signals are scrambled in the second cordless phone 300 in the same scrambling manner as the first cordless phone 100. The controller 11 of the base station 8 of the second cordless phone 300 also has a storage for storing phone numbers specifying cordless phones in which the communication signals are scrambled in the same scrambling manner as the second cordless phone 300.

Scrambling manners of cordless phones coupled to the network 7 may be also recorded. In this case, when the first cordless phone 100 communicates with the second cordless phone 300, the network 7 informs the first and second cordless phones 100 and 300 of the scrambling manners to be carried out in the second and first cordless phones 300 and 100, When the controllers 6 and 11 determine that the scrambling manners respectively carried out in the first and second cordless phones 100 and 300 are equal to the scrambling manners informed by the network, the controllers 6 and 11 make the selectors 5 and 10 to select the input ports of the privacy communication units 4 and 9. On the other hand, when the controllers 6 and 11 determine that the scrambling manners to be carried out in the first and second cordless phones 100 and 300 differ from the scrambling manners informed by the network 7, the controller 6 and 11 make the selectors 5 and 10 to select the output ports of the privacy communication units 4 and 9.

A description will now be given, with reference to FIGS. 4, 5 and 6, of the embodiment of the present invention.

Figure 4:
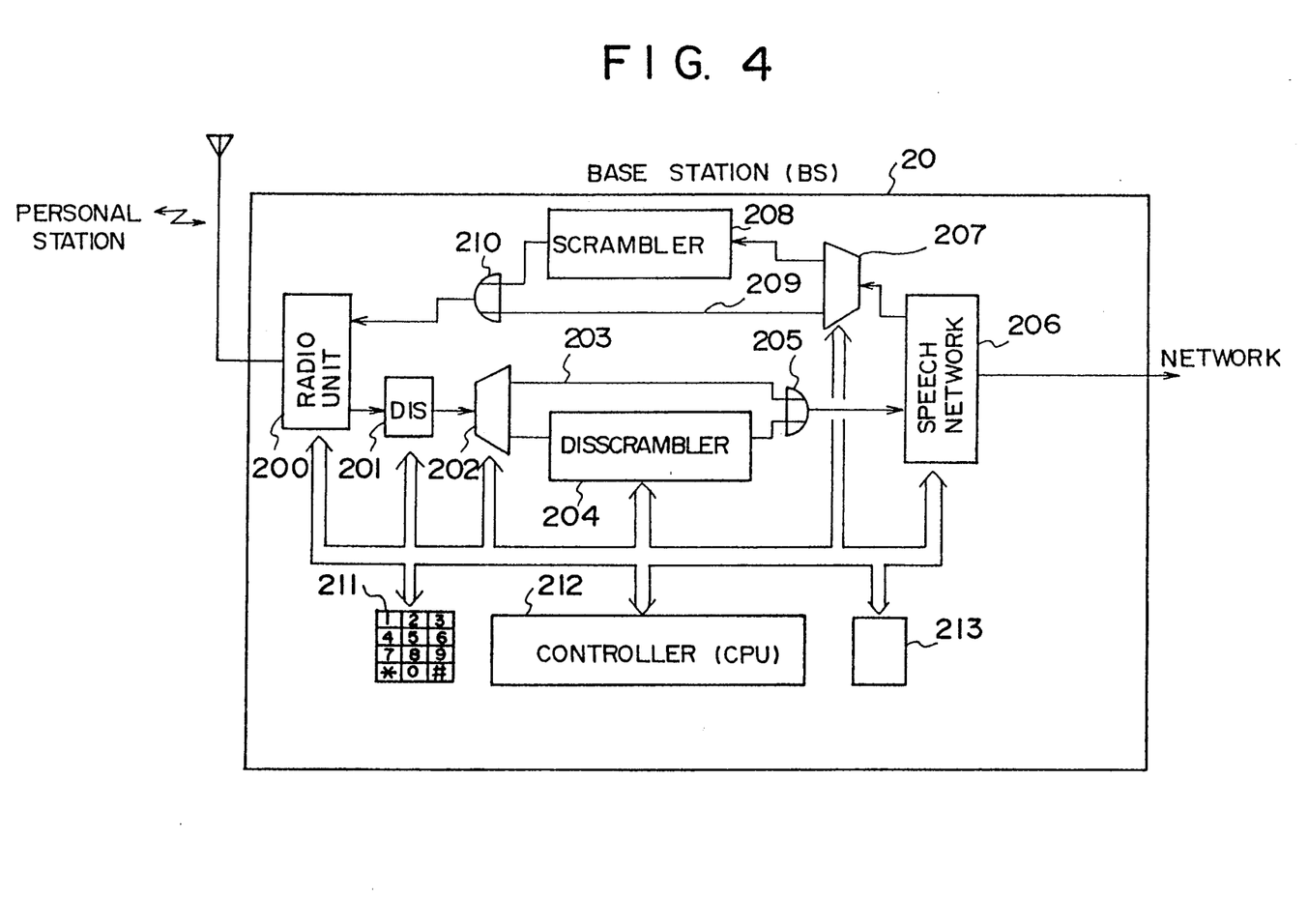
FIG. 4 is a block diagram illustrating a personal station provided in the cordless phone system according to the first embodiment of the present invention.

FIG. 4 shows a base station of a cordless phone. A base station 20 shown in FIG. 4 is coupled to a network (e.g. a public data network, a personal network, or an ISDN) by a cable formed of, for example, optical fibers. The base station 20 is also coupled to a personal station in radio. Referring to FIG. 4, the base station 20 comprises a radio unit 200, a distribution circuit 201, selectors 202 and 207, a disscrambler 204, OR gates 205 and 210, a speech network 206 and scrambler 208. The base station 20 further comprises a key-board 211, controller 212 and memory unit 213. The radio unit 200 controls transmission and receipt of communication signals and control signals in radio communication with respect to the personal station. The distribution circuit 201 supplies phone number information in the communication signals supplied from the personal station via the radio unit 200 to the controller 212. Other information in the communication signals pass through the distribution circuit 201. The selector 202 selects either a path 203 or the disscrambler 204, so that the communication signals supplied from the distribution circuit 201 is supplied to selected one of the path 203 and the disscrambler 204. The communication signals from the path 203 and the disscrambler 204 are supplied to the speech network via the OR gate 205. The speech network 206 is coupled to a public data network. The selector 207 selects either a path 209 or the scrambler 208, so that communication signals supplied from the public data network via the speech network 206 is supplied to selected one of the path 209 and the scrambler 208. The communication signals from the path 209 and the scrambler 208 are supplied to the radio unit 200 via the OR gate 210. The key-board 211 is operated to input information such as phone numbers. The controller 212 controls whole parts of the base station 20. The memory unit 213 has a ROM (Read Only Memory) and a RAM (Random Access Memory) and like. The memory unit 213 stores control programs used in the controller 212 and various control information. The memory unit 213 further stores a table indicating phone numbers specifying other cordless phones processing communication signals in the same scrambling manner as this base station 20. A network termination unit (not shown in FIG. 4) for the ISDN is provided between the base station 20 and the public data network.

Figure 5:
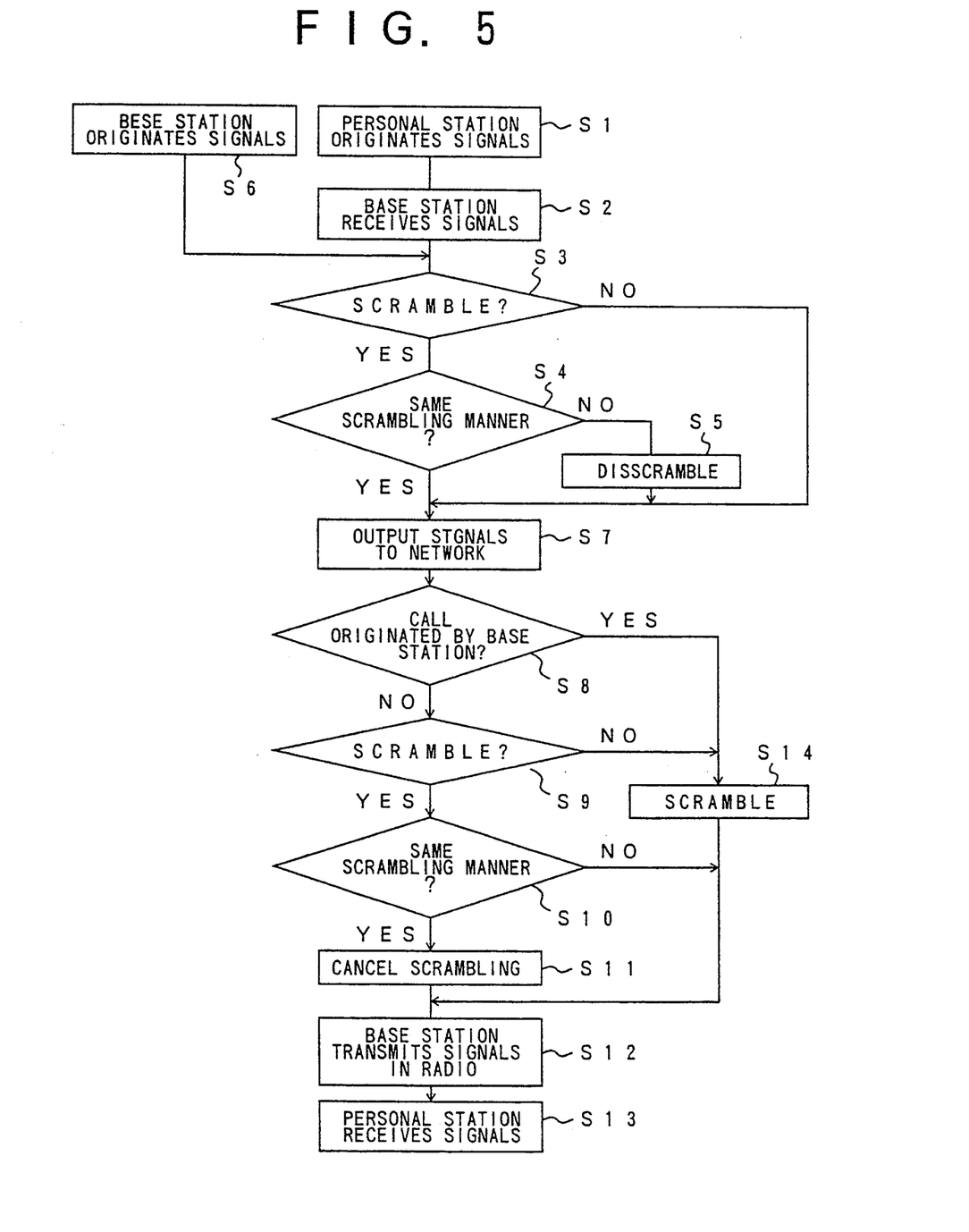
FIGS. 5 is a flow chart illustrating process carried out in the cordless phone system shown in FIGS. 3 and 4.

Communication between the first and second cordless phones is performed in accordance with a flow chart as shown in FIG. 5.

When the personal phone of the first cordless phone originates a call, the radio unit 200 of the base station 20 receives calling information (dialing information (a phone number), call control information of the ISDN and the like). The controller 212 then controls the selector 202 so that the path 203 is selected. The calling information is output to the public data network via the speech network 206. The calling information is transmitted to the base station 20 of the second cordless phone via the public data network, and the second cordless phone is called in. When a predetermined operation is performed in the second cordless phone in response to the call from the first cordless phone, the first and second cordless phone are in a state where communication can be performed. After this, the communication between the first and second cordless phone is performed in accordance with the flow chart shown in FIG. 5.

The personal station of the first cordless phone scrambles communication signals in a predetermined scrambling manner, and the scrambled communication signals are transmitted from the personal station in radio (step S1). The scrambled communication signals from the personal station are received by the radio unit 200 of the base station 20 of the first cordless phone (step S2). In the base station 20 of the first cordless phone, controller 212 determines, based on scrambling information transmitted from the personal station along with the communication signals, whether or not the received communication signals are scrambled (step S3). When the controller 212 determines that the received communication signals are scrambled, in step S3, the controller 212 determines, with reference to the table stored in the memory unit 213, whether or not the phone number included in the calling information is equal to one of the phone numbers indicated in the table (step S4). That is, step S4 determines whether or not the second cordless phone (the called station) scrambles communication signals in the same scrambling manner as the first cordless phone (the calling station). The result obtained by step S4 is YES, the controller 212 controls the selector 202 so that the path 203 is selected. As a result, the scrambled communication signals received by the radio unit 200 are supplied to the public data network via the distribution circuit 201, the selector 202, the OR gate 205 and the speech network 206 (step S7). Then the scrambled communication signals are transmitted to the base station 20 of the second cordless phone. At this time, the controller 212 controls the selector 207 so that the path 209 is selected. Thus, the speech network 206 is coupled to the radio unit 200 via the selector 207, the path 209 and the OR gate 210.

In the base station 20 of the second cordless phone, when the speech network 206 receives the scrambled communication signals transmitted from the first cordless phone, the controller 212 determines whether this call is originated by the base station of the first cordless phone or the personal station thereof (step S8). When the controller 212 determines that this call is originated by the personals station, the controller 212 further whether or not the received communication signals are scrambled (step S9). When the result obtained by step S9 is YES, the controller 212 determines, with reference to the table stored in the memory unit 213, whether or not the phone number of the first cordless phone (the calling station) is equal to one of the phone numbers indicated in the table (step S10). That is, step S10 determines whether or not the first cordless phone (the calling station) scrambles communication signals in the same scrambling manner as the second cordless phone (the called station). When the result obtained by step S10 is YES, the controller 212 controls the selector 207 so that the path 209 i.e. selected. As a result, the scrambled communication signals received by the speech network 206 are supplied to the radio unit 200 via the selector 207, the path 209 and the OR gate 210 so that the scrambling operation in the second cordless phone is cancelled (step S11). Then the scrambled communication signals are transmitted from the radio unit 200 in radio (step S12). The scrambled communication signals transmitted from the radio unit 200 are received by the personal station of the second cordless phone (step S13). In the personal station of the second cordless phone, the received scrambled communication are disscrambled. In this case, as the scrambling manner of the second cordless phone is the same as that of the first cordless phone, the original communication signals which have been transmitted from the personal station of the first cordless phone are restored by the disscrambling operation in the personal station of the second cordless phone.

Communication signals made in the personal station of the second cordless phone in response to the communication signals transmitted from the first cordless phone are processed in the same manner as in the above case, and returned to the first cordless phone.

On the other hand, when the controller 212 of the base station 20 of the first cordless phone (the calling station) determines that there is no phone number being the same as the phone number of the second cordless phone in the table, in step S4, the controller 212 controls the selector 202 so that the disscrambler 204 is selected. As a result, the scrambled communication signals output from the radio unit 200 is disscrambled by the disscrambler 204 (step S5). The communication signals (the original signals) output from the disscrambler 204 are supplied to the public data network via the OR gate 205 and the speech network 206 (step S7). The controller 212 controls also the selector 207 so that the scrambler 208 is selected.

In the base station 20 of the second cordless phone (the called station), when the speech network 206 receives the communication signals, step S9 determines that the communication signal 5 are not scrambled. Thus the controller 212 controls the selector 207 so that the scrambler 208 is selected (step S14). As a result, the communication signals received by the speech network 206 are scrambled by the scrambler 208 and supplied to the radio unit 200 via the OR gate 210. The scrambled communication signals are transmitted from the radio unit 200 in radio (step S12). The personal station of the second cordless phone receives the scrambled communication signals transmitted from the base station 20 (step S13). The scrambled communication signals are disscrambled in the personal station, so that the original communication station are restored.

Further, in a case where the base station of the first cordless phone originates a call of the second cordless phone, communication signals corresponding to speech of a user are also originated in the base station of the first cordless phone (step S6). After this, the communication signals are output from the speech network to the public data network without scrambling (step S7). In this case, in the base station 20 of the second cordless phone (the called station), the controller 212 determines that this call is originated by the base station 20 of the first cordless phone (step S8). Then, the communication signals received by the base station 20 of the second cordless phone are scrambled (step S14) and then transmitted from the radio unit 200 in radio (step S12). The scrambled communication signals received by the personal station of the second cordless phone are disscrambled, so that the original communication signals are restored.

A description will now be given, with reference to FIG. 6, of a second embodiment of the present invention.

Figure 6:
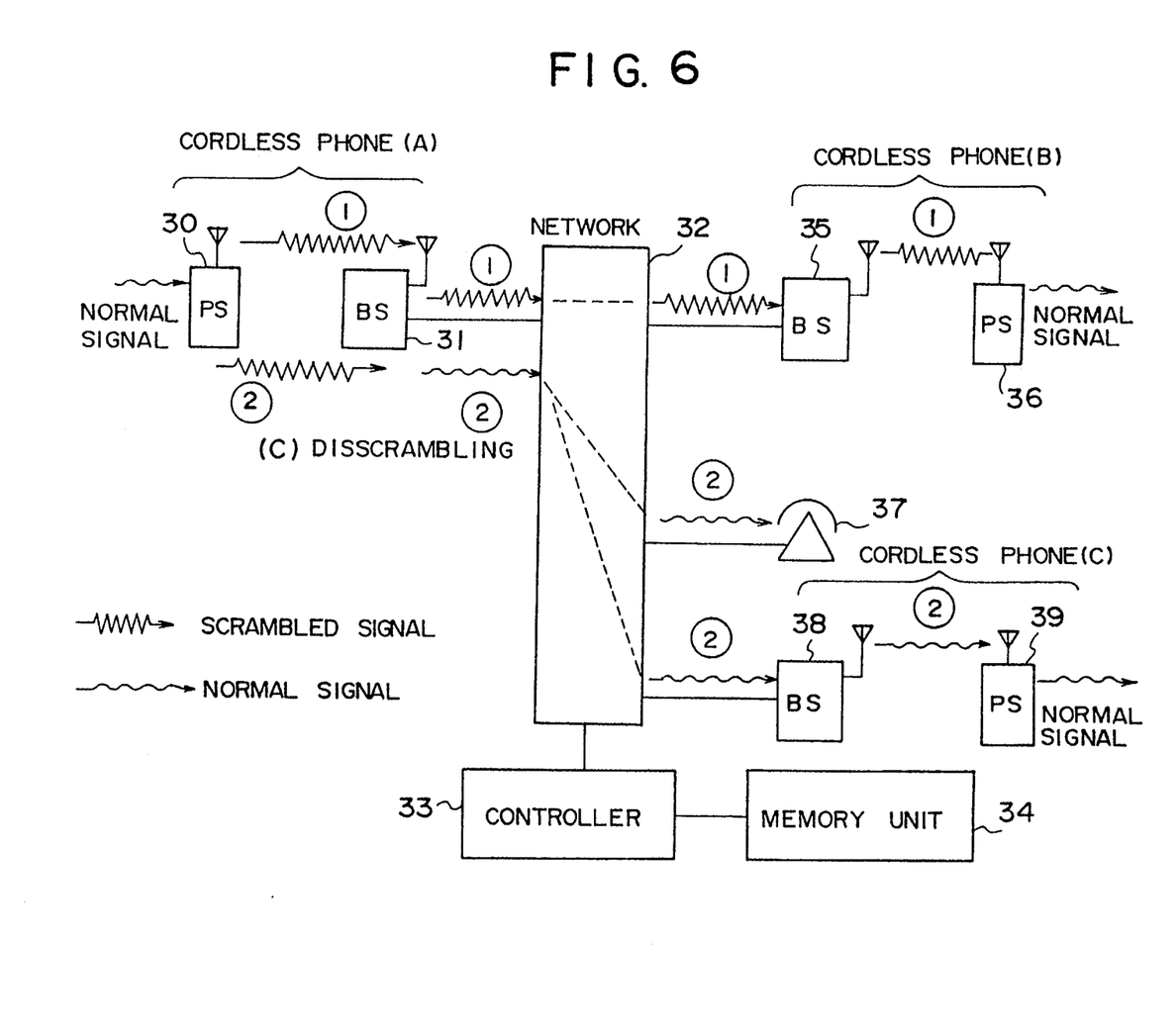
FIG. 6 is a diagram illustrating a cordless phone system according to the embodiment of a second present invention.

Referring to FIG. 6, a cordless phone system has first, second and third cordless phones (A), (B) and (C) and a normal telephone set 37. The first, second and third cordless phones (A), (B) and (C) are respectively consisted of a personal stations 30, 36 and 39 and base stations 31, 35 and 38. The base stations 31, 35 and 38 and the telephone set 37 are coupled to a network 32 (a public data network, a personal network, an ISDN, or the like) by cables. This cordless phone system also has a controller 33 for controlling the network 32 and a memory unit 34 coupled to the controller 34. The memory unit 34 stores a table indicating types of scrambling manners in the first, second and third cordless phones (A), (B) and (C). In this table, the phone number specifying the first, second and third cordless phones respectively correspond to types of scrambling manner.

In the second embodiment, when communication between a cordless phone and another one is performed via the network 32, the controller 33 controls whether or not communication signals transmitted from a base station to another one via the network are scrambled.

The personal station 30 of the first cordless phone (A) originates a call to, for example, the second cordless phone (B). When originating the call, the base station 31 of the first cordless phone (A) transmits calling information to the network 32. The calling information is supplied to the controller 33 via the network 32. The controller 33 controls the network 32 so that the first and second cordless phones (A) and (B) are connected by the network 32. If the second cordless phone (B) is not busy, the controller 33 controls the network to call the second cordless phone (B). The controller 33 determines, with reference to the table stored in the memory unit 34, whether or not a scrambling manner corresponding to the phone number of the first cordless phone (A) is the same as a scrambling manner corresponding to the phone number of the second cordless phone (B). When the controller 33 determines that the scrambling manner of the first cordless phone (A) is the same as that of the second cordless phone (B), the controller 33 supplies to the base stations 31 and 35 of the first and second cordless phone (A) and (B) via the network 32 control signals for cancelling disscramble operations in the base stations 31 and 35. As a result, communication signals scrambled by the personal station 30 of the first cordless phone (A) is supplied to the personal station 36 of the second cordless phone (B) via the base station 31 of the first cordless phone (A), the network 32 and the base station 35 of the second cordless phone (B), without the disscrambling operation and the scrambling operation (see ①shown in FIG. 6). The personal station 36 of the second cordless phone (B) then disscrambles the scrambled communication signals transmitted from the base station 35 in radio, so that the original communication signals are obtained in the personal station 36 of the second cordless phone (B).

When the controller 33 detects a call from the first cordless phone (A) to the third cordless phone (c), the controller 33 determines, with reference to the table stored in the memory unit 34, whether or not a type of the scrambling manner corresponding to the first cordless phone (A) is the same as that of the third cordless phone (C). When the controller 33 determines that the scrambling manner of the first cordless phone (A) i.e. not the same as that of the third cordless phone (C), the controller 33 supplies no control signals to the base stations 31 and 38 of the first and third cordless phone. Thus, the scrambled communication signals transmitted from the personal station 30 is disscrambled in the base station 31 of the first cordless phone (A). The communication signals transmitted to the base station 38 of the third cordless phone (C) via the network 32 is scrambled in a predetermined scrambling manner. The scrambled communication signals are then transmitted from the base station 38 in radio. The scrambled communication signals are disscrambled in the personal station 39 of the third cordless phone (c), so that the original communication signals are restored in the personal station 39.

In a case where the first cordless phone (A) calls the telephone set 37, the controller 33 controls the base station 31 of the first cordless phone (A) so that the scrambled communication signals are disscrambled in the base station 31.

States of the communication signals in the above cases where the first cordless phone (A) calls the third cordless phone (C) or the telephone set 37 are indicated by ② in FIG .6.

The present invention is not limited to the aforementioned embodiments, and variations and modifications may be made without departing from the scope of the claimed invention.

What is claimed is:

1. A cordless phone system comprising:
a first cordless phone and a second cordless phone which are coupled to each other by a network, said first cordless phone including a first personal station and a first base station, said second cordless phone including a second personal station and a second base station, said cordless phone system further comprising:
scrambling means, provided in said first personal station, for scrambling communication signals in a predetermined scrambling manner, the communication signals scrambled by said scrambling means being transmitted from said first personal station to said first base station by radio;
first relay means, provided in said first base station, for receiving the communication signals from said first personal station and for transmitting the communication signals, without disscrambling, to said second base station via said network;
second relay means, provided in said second base station, for receiving the communication signals from said first base station and for transmitting the communication signals, without scrambling, to said second personal station by radio; and
disscrambling means, provided in said second personal station, for disscrambling the communication signals transmitted from said second base station by radio in a predetermined disscrambling manner corresponding to the scrambling manner in said first personal station, so that original communication signals originated by said first personal station are restored.

2. A cordless phone system comprising:
a first cordless phone and a second cordless phone which are coupled to each other by a network, said first cordless phone being including a first personal station and a first base station, said second cordless phone including a second personal station and a second base station, said cordless phone system further comprising:
first scrambling means, provided in said first personal station, for scrambling communication signals in a first scrambling manner, the communication signals scrambled by said scrambling means being transmitted from said first personal station to said first base station by radio;
first disscrambling means, provided in said first base station, for disscrambling the communication signals transmitted from said first personal station by radio;
first canceling means, provided in said first base station, for canceling that said first disscrambling means disscrambles the communication signals;
first selecting means, provided in said first base station, for selecting either said first disscrambling means or said first canceling means, so that either communication signals disscrambled by said disscrambling means or the communication signals without disscrambling are transmitted to said second base station via said network;
second scrambling means, provided in said second base station, for scrambling the communication signals transmitted from said first base station via said network in a second scrambling manner;
second canceling means, provided in said second base station, for canceling that said second scrambling means scrambles the communication signals;
second selecting means, provided in said second base station, for selecting either said second scrambling means or said second canceling means, so that either communication signals scrambled by said second scrambling means or the communication signals without scrambling are transmitted to said second personal station by radio;
determination means for determining whether or not the first scrambling manner in said first scrambling means is the same as the second scrambling manner in said second scrambling means;
control means, coupled to said determination means, for controlling said first and second selecting means so that said first and second canceling means are selected when said determination means determines that the first scrambling manner is the same as the second scrambling manner; and
second disscrambling means, provided in said second personal station, for disscrambling the communication signals transmitted from said second base station, so that original communication signals originated by said first personal station are restored.

3. A cordless phone system as claimed in claim 2, wherein said determination means and said control means are provided in said first and second base stations.

4. A cordless phone system as claimed in claim 2, wherein said determination means and said control means are coupled to said network so that said control means controls said first and second selecting means via said network.

5. A cordless phone system as claimed in claim 2, wherein said determination means has storage means for storing table indicating whether or not the first scrambling manner and the second scrambling manner is the same as each other, said determination means determining, with reference to said table stored in said storage means, whether or not said first scrambling manner is the same as the second scrambling manner.

6. A cordless phone having a personal station and a base station to be coupled to a network by a cable, communication between said personal station and said base station being performed by radio, wherein said personal station comprises:
first scrambling mans for scrambling communication signals in a predetermined manner, the communication signals scrambled by said scrambling means being transmitted to said base station by radio,
wherein said base station comprises:
radio means for receiving the communication signals transmitted from said personal station by radio and for transmitting communication signals to said personal station by radio;
input/output means for supplying communication signals to said network and for receiving communication signals from said network;
first disscrambling means for disscrambling the communication signals supplied from said personal station via said radio means;
first canceling means for canceling that said first disscrambling means disscrambles the communication signals;
first selecting means, for selecting either said first disscrambling means or said first canceling means, so that either the communication signals disscrambled by said first disscrambling means or communication signals without disscrambling are transmitted to said network via said input/output means;
second scrambling means for scrambling communication signals supplied from said network via said input/output means;
second canceling means for canceling that said second scrambling means scrambles the communication signals; and
second selecting means for selecting either said second scrambling means or said second canceling means, so that either the communication signals scrambled by said second scrambling means or communication signals without scrambling are transmitted to said personal station via said radio means, said first and second selecting means being controlled by control signals supplied from an external unit so that said first and second selecting means respectively select said first and second canceling means when the scrambling manner in said first and second scrambling means is the same as that in another cordless phone communicated with said cordless phone;
and wherein said personal station further comprises second disscrambling means for disscrambling the communication signals transmitted from said radio means of said base station so that original communication signals originated by another cordless phone are restored.

7. A cordless phone having a personal station and a base station to be coupled to a network by a cable, communication between said personal station and said base station being performed by radio, wherein said personal station comprises:
first scrambling means for scrambling communication signals in a predetermined manner, the communication signals scrambled by said scrambling means being transmitted to said base station by radio,
wherein said base station comprises:
radio means for receiving the communication signals transmitted from said personal station by radio and for transmitting communication signals to said personal station by radio;
input/output means for supplying communication signals to said network and for receiving communication signals from said network;
first disscrambling means for disscrambling the communication signals supplied from said personal station via said radio means;
first canceling means for canceling that said first disscrambling means disscrambles the communication signals;
first selecting means, for selecting either said first disscrambling means or said first canceling means, so that either the communication signals disscrambled by said first disscrambling means or communication signals without disscrambling are transmitted to said network via said input/output means;
second scrambling means for scrambling communication signals supplied from said network via said input/output means;
second canceling means for canceling that said second scrambling means scrambles the communication signals;
second selecting means for selecting either said second scrambling means or said second canceling means, so that either the communication signals scrambled by said second scrambling means or communication signals without scrambling are transmitted to said personal station via said radio means;
determination means for determining whether or not the scrambling manner in said first and second scrambling means is the same as that in another cordless phone communicated with said cordless phone; and
control means for controlling said first and second selecting means so that said first and second canceling means are selected when said determination means determines that the scrambling manner in said first and second scrambling means is the same as that in another cordless phone communicated with said cordless phone;
and wherein said personal station further comprises second disscrambling means for disscrambling the communication signals transmitted from said radio means of said base station so that original communication signals originated by another cordless phone are restored.

8. A cordless phone as claimed in claim 7, wherein said determination means has storage means for storing table indicating other cordless phones each of which scrambles communication signals in the same manner as said first and second scrambling means, said determination means determining, with reference to said table stored in said storage means, whether or not the scrambling manner in said first and second scrambling means is the same as that in another cordless phone communicated with said cordless phone.

* * * * *